United States Patent
Huang et al.

(10) Patent No.: US 12,503,601 B2
(45) Date of Patent: Dec. 23, 2025

(54) CURABLE THERMALLY CONDUCTIVE POLYSILOXANE COMPOSITION WITH INCREASED THIXOTROPIC INDEX

(71) Applicant: Dow Silicones Corporation, Midland, MI (US)

(72) Inventors: Yan Huang, Shanghai (CN); Dorab Bhagwagar, Midland, MI (US); Zhongwei Cao, Shanghai (CN)

(73) Assignee: Dow Silicones Corporation, Midland, MI (US)

( * ) Notice: Subject to any disclaimer, the term of this patent is extended or adjusted under 35 U.S.C. 154(b) by 527 days.

(21) Appl. No.: 17/801,539

(22) PCT Filed: May 6, 2020

(86) PCT No.: PCT/CN2020/088737
§ 371 (c)(1),
(2) Date: Aug. 23, 2022

(87) PCT Pub. No.: WO2021/223095
PCT Pub. Date: Nov. 11, 2021

(65) Prior Publication Data
US 2023/0295431 A1  Sep. 21, 2023

(51) Int. Cl.
| | |
|---|---|
| *C08L 83/04* | (2006.01) |
| *C08J 7/04* | (2020.01) |
| *C08K 3/22* | (2006.01) |
| *C08K 3/36* | (2006.01) |
| *C08L 83/06* | (2006.01) |

(52) U.S. Cl.
CPC ............. *C08L 83/06* (2013.01); *C08J 7/0427* (2020.01); *C08K 3/22* (2013.01); *C08K 3/36* (2013.01); *C08J 2383/06* (2013.01); *C08K 2003/2227* (2013.01); *C08K 2201/001* (2013.01); *C08K 2201/014* (2013.01); *C08L 2203/20* (2013.01)

(58) Field of Classification Search
CPC ....................................................... C08L 83/04
USPC ............................................................ 528/15
See application file for complete search history.

(56) References Cited

U.S. PATENT DOCUMENTS

| | | | |
|---|---|---|---|
| 5,457,148 A | 10/1995 | Lucas | |
| 5,804,631 A | 9/1998 | Mine et al. | |
| 6,121,368 A | 9/2000 | Heying et al. | |
| 6,306,957 B1* | 10/2001 | Nakano | C08L 83/04 524/700 |
| 6,448,329 B1 | 9/2002 | Hirschi et al. | |
| 9,424,977 B2* | 8/2016 | Iwata | C08L 83/00 |
| 2010/0140538 A1* | 6/2010 | Sekiba | C08K 5/56 252/78.3 |
| 2016/0086713 A1 | 3/2016 | Iwata et al. | |

FOREIGN PATENT DOCUMENTS

| | | |
|---|---|---|
| CN | 101885919 A | 11/2010 |
| CN | 105217673 A | 1/2016 |
| EP | 1079398 A2 | 2/2001 |
| JP | 2003327833 A | 11/2003 |
| JP | 2016084378 A | 5/2016 |

* cited by examiner

*Primary Examiner* — Margaret G Moore
(74) *Attorney, Agent, or Firm* — Steven W. Mork

(57) ABSTRACT

A composition contains: (a) a vinyl-functional polysiloxane; (b) a silyl hydride functional polysiloxane having on average at least two silyl hydride groups per molecule; (c) 60 to 92 weight-percent thermally conductive filler; (d) a platinum hydrosilylation catalyst; and (e) 0.05 to 2.0 weight-percent of a trialkoxy-functional polysiloxane; where the trialkoxy-functional polysiloxane has two or more trialkoxy functionalities per molecule and a number average molecular weight of 1200 or more and where weight-percents are relative to the composition weight.

9 Claims, No Drawings

CURABLE THERMALLY CONDUCTIVE POLYSILOXANE COMPOSITION WITH INCREASED THIXOTROPIC INDEX

FIELD OF THE INVENTION

The present invention relates to a polysiloxane composition capable of undergoing hydrosilylation curing.

INTRODUCTION

Curable thermally conductive polysiloxane compositions are useful in the electronics industry to provide a thermal bridge between components such as a heat source and a heat sink. Unlike thermal grease, curable thermally conductive polysiloxane compositions are curable, meaning that they can react to form a crosslinked polysiloxane matrix comprising thermally conductive filler. Generally, curable thermally conductive polysiloxane compositions are applied to a substrate so as to be in thermal contact with the substrate and generally at least one other component and then cured to form a cured composition that acts as a thermal bridge between the substrate and any other component in contact with the cured composition.

Thermally conductive silicone compositions typically comprise relatively high concentrations of conductive filler in a polysiloxane matrix. The thermally conductive filler tends to be present at concentration of 60 weight-percent (wt %) or more and can be present at concentrations of 90 wt % or more of the polysiloxane composition. It is important for the thermally conductive polysiloxane composition to be stable against settling, or separating, of the thermally conductive filler out from the polysiloxane matrix it is in so that the composition will remain homogeneous while being stored prior to use. One way to improve stability to filler setting is to increase the viscosity of the composition as it is stored. However, increasing viscosity of the composition also generates difficulties in applying the composition to a substrate. Typically, applying thermally conductive polysiloxane compositions requires extruding the composition through an orifice to dispose it onto a substrate. If the viscosity of the composition is too high, then it is difficult to extrude during application onto a substrate. Hence, there is a challenge in balancing the viscosity of a conductive silicone composition between high viscosity to stabilize filler from settling and low viscosity to facilitate application of the composition to a substrate.

One approach to addressing the challenge of thermally conductive polysiloxane composition viscosity is to induce shear thinning behavior to the composition. A number of approaches are known in literature for adding thixotropic agents to compositions to achieve shear thinning behavior. Thermally conductive polysiloxane compositions offer unique challenge to this approach because the high concentration of thermally conductive fillers creates an environment where solid filler-filler interactions effect viscosity and possible adsorption of thixotropic agents on to the filler surfaces may render the agent less effective at inducing shear thinning behavior to the overall composition. Moreover, it can be particularly desirable to identify a thixotropic agent that not only induces shear thinning behavior in highly filled thermally conductive polysiloxane compositions, but does so by preferentially increasing the composition's low shear viscosity relative high shear viscosity to achieve a thixotropic index that is at least 50 percent (%) higher than the composition without the thixotropic additive.

This challenge becomes even more difficult in the context of a 2-part curable thermally conductive polysiloxane composition. Each part of a 2-part curable thermally conductive polysiloxane composition is chemically different from one another yet is highly filled with thermally conductive filler. Desirably, each part of the 2-part composition is shear thinning so they are each stable to filler settling when apart but are readily mixed and dispensed. Even more desirably, each part comprises the same thixotropic agent so that when the two parts are mixed the thixotropic agents are compatible.

Hence, it is desirable and would advance the art to identify a thixotropic agent that induces shear thinning properties to a thermally conductive polysiloxane by preferentially increasing the composition's low shear viscosity relative to high shear viscosity to achieve an increase in thixotropic index that is at least 50%, preferably 75% or more, even 100% or more relative to the composition without the thixotropic additive. Even more desirable is if such a thixotropic agent performs in such a manner in each part of a 2-part curable thermally conductive polysiloxane composition.

BRIEF SUMMARY OF THE INVENTION

The present invention provides a thermally conductive polysiloxane that comprises a thixotropic agent that induces shear thinning properties to the thermally conductive polysiloxane by preferentially increasing the composition's low shear viscosity relative to high shear viscosity to achieve a thixotropic index that is at least 50% higher, preferably at least 75% higher, and can be 100% or more higher than the composition without the thixotropic additive. Moreover, the thermally conductive polysiloxane can be a 2-part curable thermally conductive polysiloxane composition where the thixotropic agent performs in such a manner in each of the two parts.

The invention is a result of discovering that trialkoxy functional polysiloxanes having two or more trialkoxy functionalities, preferably trimethoxy functionalities, per molecule and a number average molecular weight above 1,200, and preferably of 2,000 or more, can act as thixotropic agent in thermally conductive polysiloxanes and even in each component of a 2-part curable thermally conductive polysiloxane composition by preferentially increasing the composition's low shear viscosity relative to high shear viscosity to achieve an increase in thixotropic index that is at least 50%, 75% or more, even 100% or more relative to the composition without the thixotropic additive. However, surprisingly, the trialkoxy functional polysiloxanes need to be present at a 2.0 wt % or less, and at the same time generally 0.05 wt % or more of the composition weight. Too much of the trialkoxy functional polysiloxane actually results in less than 50% increase in thixotropic index.

In a first aspect, the present invention is a composition comprising: (a) a vinyl-functional polysiloxane; (b) a silyl hydride functional polysiloxane having on average at least two silyl hydride groups per molecule; (c) 60 to 92 weight-percent thermally conductive filler; (d) a platinum hydrosilylation catalyst; and (e) 0.05 to 2.0 weight-percent of a trialkoxy-functional polysiloxane; where the trialkoxy-functional polysiloxane has two or more trialkoxy functionalities per molecule and a number average molecular weight of 1200 or more and where weight-percents are relative to the composition weight.

In a second aspect, the present invention is a process comprising the steps of: (a) combining together all of the components of the composition of the first aspect; (b) optionally heating; and (c) allowing a hydrosilylation curing of the vinyl functional polysiloxane and the silyl hydride functional polysiloxane to form a cured composition.

In a third aspect, the present invention is an article comprising a cured composition in contact with a substrate prepared according to the process of the second aspect.

The composition of the present invention is useful as a curable thermally conductive polysiloxane composition that can be used as a thermal bridging material in devices such as electronic devices.

DETAILED DESCRIPTION OF THE INVENTION

Test methods refer to the most recent test method as of the priority date of this document when a date is not indicated with the test method number. References to test methods contain both a reference to the testing society and the test method number. The following test method abbreviations and identifiers apply herein: ASTM refers to American Society for Testing and Materials; EN refers to European Norm; DIN refers to Deutsches Institut für Normung; ISO refers to International Organization for Standards; and UL refers to Underwriters Laboratory.

Products identified by their tradename refer to the compositions available under those tradenames on the priority date of this document.

"Multiple" means two or more. "And/or" means "and, or as an alternative". All ranges include endpoints unless otherwise indicated. Unless otherwise stated, all weight-percent (wt %) values are relative to composition weight and all volume-percent (vol %) values are relative to composition volume.

"Polysiloxane" and "siloxane" are interchangeable and refer to molecules having multiple Si—O—Si linkages.

"Thixotropic index" for a composition refers to the ratio of composition viscosity under low shear to viscosity of the composition under high shear. Herein, determine viscosity of polysiloxanes and compositions using a Cone-Plate rheometer with a CP#52 spindle at a speed of 0.1 revolutions per minute (0.2 reciprocal seconds (s$^{-1}$) shear rate) for determining low shear viscosity and at 10 revolutions per minute (20 s$^{-1}$ shear rate) for determining high shear viscosity. Viscosity is in milliPascal*seconds (mPa*s) unless otherwise stated.

"Molecular weight" refers to number average molecular weight in Daltons unless otherwise stated. Determine molecular weight using triple-detector gel permeation chromatography (light-scattering, refractive index and viscosity detectors) and a single polystyrene standard.

The composition of the present invention comprises a vinyl-functional polysiloxane. Desirably, the vinyl-functional polysiloxane contains, on average, two or more vinyl functionalities per molecule. The vinyl functionalities can be pendant, terminal or present as both pendant and terminal groups on the vinyl-functional polysiloxane. Desirably, the vinyl functional polysiloxane is a linear polysiloxane having the following molecular structure (I):

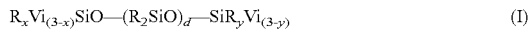

$$R_xVi_{(3-x)}SiO—(R_2SiO)_d—SiR_yVi_{(3-y)} \quad (I)$$

where R is independently in each occurrence selected from alkyl and aryl groups having from one to 6 carbon atoms; Vi is a vinyl group (—CH=CH$_2$); x and y indicate the average number of terminal R groups on each end of the linear polysiloxane and are each independently selected from a number in a range of 0 to 2, preferably 1 to 2, and desirably x=y; (3-x) and (3-y) indicate the average number of terminal Vi groups on each end of the linear polysiloxane; and d is the average number of (R$_2$SiO) groups in the linear polysiloxane and is typically 10 or more, preferably 50 or more and at the same time 1000 or less, preferably 500 or less. Desirably, R in each occurrence is methyl. At the same time, it is generally desirable for x and y to each be 2.

Examples of suitable vinyl-functional polysiloxanes include vinyl terminated polydimethylsiloxanes available from Gelest under the name DMS-V21 (Structure (I) where each R is methyl, x=y=2 and d is approximately 78 to provide a molecule that has a viscosity of 100 centistokes and a molecular weight of 6,000) and DMS-V25 (Structure (I) where each R is methyl, x=y=2 and d is approximately 230 to provide a molecule that has a viscosity of 500 centistokes and a molecular weight of 17,200) and from The Dow Chemical Company under the name DOWSIL™ SFD-119 Fluid (Structure (I) where each R is methyl, x=y=2 and d is approximately 162 to provide a molecule that has a viscosity of 450 centistokes and a molecular weight of 12,000), and DOWSIL™ SFD-117 Fluid (Structure (I) where each R is methyl, x=y=2 and d is approximately 324 to provide a molecule that has a viscosity of 2000 centistokes and a molecular weight of 24,000). DOWSIL is a trademark of The Dow Chemical Company.

Typically, the concentration of vinyl-functional polysiloxanes in the composition is 5 wt % or more, 10 wt % or more 15 wt % or more, even 20 wt % or more while at the same time is typically 35 wt % or less, and can be 30 wt % or less, 25 wt % or less, 20 wt % or less, or even 15 wt % or less based on composition weight. The concentration of vinyl-functional polysiloxanes usually varies in these ranges depending on the amount of thermally conductive filler in the composition, which is typically selected based on the desired thermal conductivity properties for the composition.

The composition of the present invention comprises a silyl hydride functional polysiloxane having on average at least two silyl hydride groups per molecule. For avoidance of doubt, a silyl hydride group is a SiH group. The silyl hydride functional polysiloxane is sometimes called a crosslinker in the composition. Desirably, the silyl hydride functional polysiloxane is a linear polysiloxane having the following general molecule structure:

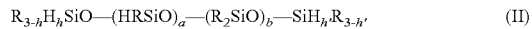

$$R_{3-h}H_hSiO—(HRSiO)_a—(R_2SiO)_b—SiH_hR_{3-h'} \quad (II)$$

where R is as described above; H is hydrogen, subscripts h and h' refer to the average number of terminal hydrogens on the respective ends of the molecule and have a value of 0, 1, 2 or 3 (preferably, 0, 1 or 2, more preferably 0 or 1, most preferably 0); subscript a is the average number of (HRSiO) groups per molecule and is generally; subscript b is the average number of (R$_2$SiO) groups per molecule. Subscript a or subscript b can be zero, but not both subscript a and b. Preferably, subscript a is one or more, and can be 5 or more, even 10 or more while at the same time is typically 50 or less, and can be 40 or less, 30 or less even 20 or less. Subscript b is desirably 0 or more and can be one or more 2 or more, 3 or more, 4 or more, even 5 or more, while at the same time is typically 150 or less, preferably 100 or less. At the same time, subscript a is desirably 5 percent (%) or more, 6% or more, 7% or, 8% or more, 9% or more, 10% or more, 15% or more, 20% or more, 25% or more, even 30% or more while at the same time is typically 50% or less, 45% or less, 40% or less, 35% or less, and can be 30% or less, 25% or less, 20% or less, 15% or less, even 10% or less of the sum of subscripts a and b. The silyl hydride functional polysiloxane typically has a molecular weight of 1000 or more, 1500 or more, 1900 or more 2000 or more and at the same time typically 5000 or less, 4000 or less, 3000 or less, 2500 or less or even 2000 or less.

Examples of suitable silyl hydride functional polysiloxanes include trimethylsiloxy terminate hydride functional polymers available from Gelest under the names HMS-071 (structure (II) where R is methyl and a is 6-7% of the sum of a and b with a number average molecular weight of 1,900-2,000 and viscosity of 19 mPa*s),HMS-301 (structure (II) where R is methyl and a is 25-35% of the sum of a and b with a number average molecular weight of 1900-2000 and viscosity of 14 mPa*s) and DMS-H11 (structure (II) with terminal hydrogens, viscosity of 7-10 mPa*s and number average molecular weight of 1000-1100).

Typically, the concentration of silyl hydride functional polysiloxanes in the composition is 0,2 wt % or more, and can be 0.5 wt % or more, 1.0 wt % or more, 2.0 wt % or more, even 3.0 wt % or more while at the same time is typically 8 wt % or less and can be 5 wt % or less based on composition weight. The concentration of silyl hydride functional polysiloxane and vinyl functional polysiloxane is in the composition is desirably such that the molar ratio of the total silyl hydride group to vinyl groups (SiH/Vi ratio) is 0.5 or more, even 1.0 or more while at the same time is typically 3.0 or less, even 2.0 or less.

The composition comprises a thermally conductive filler. In the broadest scope of the present invention, the composition of the conductive fillers can be of any composition that has a higher thermal conductivity than the polysiloxane. For example, the thermally conductive fillers can each independently be particles of material selected from a group consisting of aluminum, copper, silver, carbon nanotubes, carbon fiber, graphene, graphite, silicon nitride, boron nitride, aluminum nitride, diamond, silicon carbide, alumina, aluminum trihydrate, zinc oxide, beryllium oxide and magnesium oxide. Desirably, the thermally conductive filler comprises or even consists of alumina particles.

The filler particles can be of any typical size or combination of sizes commonly used in thermally conductive compositions. Generally, it is desirable for the thermally conductive particles to have a median particle size of 0.2 micrometers or more, and can have a median particle size of 0.5 micrometers or more, 1.0 micrometers or more, 1.5 micrometers or more, 2.0 micrometers or more, 4.0 micrometers or more, 8.0 micrometers or more, 10.0 micrometers or more, 15 micrometers or more, 20 micrometers or more, 25 micrometer or more, even 30 micrometers or more, while at the same time the median particle size is typically 50.0 micrometers or less, 40 micrometer or less, 30 micrometers or less, 20 micrometer or less, 15 micrometers or less, 10.0 micrometers or less, 9.0 micrometers or less, 8.0 micrometers or less, 7.0 micrometers or less, 6.0 micrometers or less, 5.0 micrometers or less, 4.0 micrometers or less, 3.0 micrometers or less, even 2.0 micrometers or less. Determine median particle size of a filler by laser diffraction particle size analysis using a HELOS Instrument, Sympatec GmbH, Clausthal-Zellerfeld, Germany.

The composition can, and desirably does, comprise thermally conductive filler particles having two or more, even three or more different median particle sizes. By combining thermally conductive filler particles of different sizes the composition can contain higher loadings of thermally conductive filler particles without increasing the overall viscosity as much as if all the thermally conductive filler particles were all the same size at that same loading. For instance, the composition can comprise a combination of thermally conductive fillers that are relatively small (median particle size in a range of 1.0 to 5.0 micrometers) in combination with a larger sized thermally conductive filler (median particle size in a range of greater than 5.0 micrometers, preferably 6.0 micrometers or more, even 8.0 micrometer or more and at the same time 10.0 micrometers or less). Another option is for the composition to comprise thermally conductive fillers having three different median particle sizes. For instance, the thermally conductive particles can comprise a combination of small, medium and large particles where the small particles have a median particle size of 0.1 micrometers or more, preferably 0.2 micrometers or more and at the same time 1.0 micrometers or less, preferably 0.8 micrometers or less, and can be 0.6 micrometers or less, 0.5 micrometers or less, even 0.4 micrometers or less; the medium particles have a median particle size of 1.1 micrometer or more, preferably 2 micrometers or more and at the same time typically 5.0 micrometers or less, preferably 4.5 micrometers or less, and can be 4.0 micrometers or less, 3.5 micrometers or less, 2.5 micrometers or less and even 2 micrometers or less; and the large particles have a median particle size of 5.1 micrometers or more, 6.0 micrometers or more, 7.0 micrometers or more, even 8.0 micrometers or more while at the same time is typically 50 micrometers or less, 40 micrometers or less, 30 micrometers or less, 20 micrometers or less, or even 10 micrometers or less, 9 micrometers or less, or 8 micrometers or less.

The combined concentration of all thermally conductive fillers is typically 60 wt % or more, and can be 65 wt % or more, 70 wt % or more, 75 wt % or more, 80 wt % or more, even 90 wt % or more and at the same time is typically 92 wt % or less, and can be 90 wt % or less, 85 wt % or less, 80 wt % or less, 75 wt % or less, 70 wt % or less, or even 65 wt % or less with wt % relative to composition weight. When the thermally conductive fillers consist of a combination of two different sized fillers (for example, the relatively small and larger sized fillers described above) then it is desirable for the larger sized filler to be present at a higher wt % than the smaller sized filler and preferably the larger sized filler is present at approximately twice the w % of the smaller sized filler.

The composition comprises a platinum hydrosilylation catalyst. The platinum hydrosilylation can be a single catalyst or a combination of more than one catalyst. Suitable platinum hydrosilylation catalysts include platinum metal as well as platinum compounds and complexes such as platinum (0)-1,3-divinyl-1,1,3,3-tetramethyldisiloxane (Karstedt's catalyst), $H_2PtCl_6$, di-μ-carbonyl di-π-cyclopentadienyldinickel, platinum-carbonyl complexes, platinum-divinyltetramethyldisiloxane complexes, platinum cyclovinylmethylsiloxane complexes, platinum acetylacetonate (acac), platinum black, platinum compounds such as chloroplatinic acid, chloroplatinic acid hexahydrate, a reaction product of chloroplatinic acid and a monohydric alcohol, platinum bis(ethylacetoacetate), platinum bis(acetylacetonate), platinum dichloride, and complexes of the platinum compounds with olefins or low molecular weight organopolysiloxanes or platinum compounds microencapsulated in a matrix or core-shell type structure. The hydrosilylation catalyst can be part of a solution that includes complexes of platinum with low molecular weight organopolysiloxanes that include 1,3-diethenyl-1,1,3,3-tetramethyldisiloxane complexes with platinum. These complexes may be microencapsulated in a resin matrix. The catalyst can be 1,3-diethenyl-1,1,3,3-tetramethyldisiloxane complex with platinum. Suitable hydrosilylation catalysts include those described in, for example, U.S. Pat. Nos. 3,159,601; 3,220,972; 3,296,291; 3,419,593; 3,516,946; 3,814,730;

3,989,668; 4,784,879; 5,036,117; and 5,175,325. Microencapsulated hydrosilylation catalysts and methods of preparing them are exemplified in U.S. Pat. Nos. 4,766,176 and 5,017,654.

When the composition is a one-part system where all of the components reside together in a single mixture then it is desirable for the platinum catalyst to be selected from platinum compounds microencapsulated in a matrix or core-shell type structure in order to achieve shelf stability. Generally, heating the one-part system then releases the platinum catalyst from its encapsulant and to trigger the reaction.

The platinum hydrosilylation catalyst is typically present at a concentration of one weight-part per million (ppm) or more, preferably 5 ppm or more, 10 ppm or more, 20 ppm or more, 30 ppm or more, 50 ppm or more, 75 ppm or more, 100 ppm or more, while at the same time is typically 200 ppm or less, 100 ppm or less, or even 50 ppm or less with ppm based on weigh parts of composition.

The composition comprises a trialkoxy-functional polysiloxane. Desirably, the "alkoxy" is selected from alkoxy groups having from one to six carbon atoms, more desirably it is selected from triethoxy-functional and trimethoxy-functional polysiloxanes. Even more desirably, the trialkoxy-functional polysiloxane is trimethoxy-functional siloxane.

The trialkoxy-functional polysiloxane has two or more trialkoxy functionalities per molecule. Typically, the trialkoxy-functional polysiloxane has, on average, 2 or more, 3 or more, even 4 or more trialkoxy functionalities per molecule while at the same time typically has on average 20 or fewer, and can have 10 or fewer, or even 5 or fewer trialkoxy functionalities per molecule. The trialkoxy-functional polysiloxane can be linear, branched or a blend of linear and branched with respect to polysiloxane chains. A linear polysiloxane comprises combined concentration of zero to 3 mole-percent (mol %) of —R'SiO$_{3/2}$ and SiO$_{4/2}$ siloxane units, where R' is selected from hydrogen, aryl and alkyl groups. Branched trialkoxy-functional polysiloxanes comprise more than 3 mol %, and typically comprise 10 mol % or more, 25 mol % or more and even 50 mol % or more R'SiO$_{3/2}$ and SiO$_{4/2}$ siloxane units. For example, the trialkoxy-functional polysiloxane can be selected from those with molecular structures (III)-(V) as described below.

When the trialkoxy-functional polysiloxane is linear, the trialkoxy functionality can be terminal, pendant or both terminal and pendant. Terminal functionalities are located on the ends of a linear polymer while pendant functionalities extend off from the polymer chain between the two ends. For example, the trialkoxy-functional polysiloxane can be or comprise a linear polysiloxane with molecular structure (III) having terminal trialkoxy functionality:

   (III)

where R is as previously defined (and is preferably methyl) and subscript c is the average number of (OSiR$_2$) siloxane units per molecule and generally has a value of 13 or more, 20 or more, 30 or more, 40 or more, 50 or more, 75 or more, 100 or more, 150 or more, 200 or more, 300 or more, 400 or more 500 or more 600 or more, even 650 or more, while at the same time is generally 2000 or less, 1000 or less, 900 or less, 800 or less, 700 or less, 650 or less, even 645 or less.

The trialkoxy-functional polysiloxane can alternatively have the following related molecular structure (IIIb):

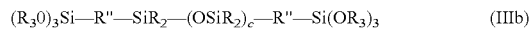   (IIIb)

where R, subscript c are as previously defined for molecular structure (III) and R" is a divalent hydrocarbon having from one to 6 carbons, and is preferably —CH$_2$CH$_2$—.

The trialkoxy-functional polysiloxane can be or comprise a linear polysiloxane with molecular structure (IV) having pendant trialkoxy functionality:

R$_3$SiO—(SiR$_2$O)$_m$—(SiRAO)$_n$—SiR$_3$   (IV)

where each R is independently as described previously (and is preferably methyl), subscript m is the average number of (SiR$_2$O) per molecule and is typically has values as described for subscript c of molecular structure (III), subscript n is the average number of (SiRAO) units per molecule and is 2 or more, preferably and generally has values as described for subscript c for molecular structure (III), and A has the following structure:

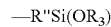

where R is a previously described (and is preferably methyl), and R" is as previously defined for molecular structure (IIIb).

The trialkoxy-functional polysiloxane can be or comprise a branched polysiloxane with molecular structure (V):

Si[—(OSiR$_2$)$_p$—R"—Si(OR$_3$)]$_4$   (V)

where R and R" are as previously described, where R is preferably methyl and R" is preferably —CH$_2$CH$_2$—, and subscript p is the average number of (OSiR$_2$) siloxane units per molecule and is typically 20 or more, 25 or more, 30 or more, 35 or more, 40 or more, 45 or more, even 50 or more while at the same time is typically 100 or less, 75 or less, 60 or less, 50 or less, even 40 or less.

The trialkoxy-functional polysiloxane has a number average molecular weight of 1200 or more and can have a number average molecular weight of 1400 or more 1500 or more, 1600 or more 1700 or more, 1800 or more, 1900 or more, 2000 or more, 3000 or more, 4000 or more, 5000 or more, 6000 or more, 7000 or more, 8000 or more, 9000 or more 10,000 or more, 11,000 or more, even 12,000 or more while at the same time typically has a number average molecular weight of 100,000 or less, 90,000 or less, 80,000 or less, 70,000 or less, 60,000 or less, 50,000 or less, 40,000 or less, 30,000 or less, 20,000 or less, even 15,000 or less.

Desirably, the trialkoxy-functional polysiloxane contain one or fewer, preferable is free of silyl hydride (—SH) groups.

Trialkoxy-functional polysiloxane is desirably present at a concentration of 0.025 wt % or more, 0.05 wt % or more, preferably 0.10 wt % or more, 0.15 wt % or more, 0.20 wt % or more, 0.25 wt % or more and can be present at a concentration of 0.30 wt % or more, 0.40 wt % or more, 0.50 wt % or more 0.60 wt % or more, even 0.70 wt % or more while at the same time is present at a concentration of 2.0 wt % or less, preferably 1.5 wt % or less, 1.0 wt % or less, 0.75 wt % or less, 0.60 wt % or less, 0.55 wt % or less, 0.50 wt % or less, with wt % relative to composition weight. Surprisingly, it has been discovered that when the trialkoxy-functional polysiloxane is present at a concentration above 2.0 wt % the thixotropic index of the composition increases by less than 50%. Lower concentration have surprisingly been found to increase the thixotropic index of the composition more dramatically. For instance, the thixotropic index unexpectedly increases by 100% or more when the concentration of trialkoxy-functional polysiloxane is present at a concentration of 0.05 wt % or more and at the same time 0.75 wt % or less, even 0.60 wt % or less, or 0.55 wt % or less. The trialkoxy-functional polysiloxane induces an increase in thixotropic index by preferentially increasing the low shear viscosity of the composition relative to the high shear viscosity.

The composition can, and preferably does, further comprise one or a combination of more than one treating agent. Treating agents serve to improve dispersion of the filler into the other components by reducing filler agglomeration and filler-filler interactions, improve wet-out of the filler surface, reduce viscosity of the composition, and cap reactive groups on filler surfaces to prevent reactions with the filler that might compromise shelf life of the composition. The treating agent comprises, or consists of, one or both of an alkyltrialkoxysilane and monotrialkoxysiloxy-terminated diorganopolysiloxane.

The alkyltrialkoxysilane is of the general formula: $(R^1)(R^2O)_3Si$; where $R^1$ is an alkyl desirably having 6 or more, 7 or more, 8 or more, 9 or more, 10 or more, 11 or more, 12 or more, 13 or more, 14 or more, 15 or more, even 16 or more carbon atoms while at the same time typically has 18 or fewer and can have 17 or fewer, 16 or fewer, 15 or fewer, 14 or fewer, 13 or fewer, 12 or fewer, 11 or fewer or even 10 or fewer carbon atoms on average per molecule; and $R^2$ is desirably an alkyl having one or more, 2 or more, 3 or more, 4 or more, 5 or more, even 6 or more while at the same time typically contains 10 or fewer, 9 or fewer, 8 or fewer, 7 or fewer, 6 or fewer, 5 or fewer, 4 or fewer, 3 or fewer, even 2 or fewer carbon atoms. Desirably, the alkyltrialkoxysilane is an alkyltrimethoxy silane with the alkyl group as described above. One example of a desirably alkyl trialkoxy silane is n-decyltrimethoxy silane. The concentration of alkyltrialkoxysilane is generally zero wt % or more, 0.05 wt % or more, 0.10 wt % or more, 0.20 wt % or more, 0.22 wt % or more, 0.24 wt % or more while at the same time is generally 0.30 wt % or less, preferably 0.28 wt % or less, 0.26 wt % or less 0.24 wt % or less and can be 0.22 wt % or less based on the composition weight.

The monotrialkoxysiloxy-terminated diorganopolysiloxane generally has the following molecular structure (VI):

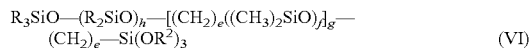
$$R_3SiO\text{—}(R_2SiO)_h\text{—}[(CH_2)_e((CH_3)_2SiO)_f]_g\text{—}(CH_2)_e\text{—}Si(OR^2)_3 \qquad (VI)$$

where: R and $R^2$ are each independently in each occurrence as defined above; subscript h is the average number of $(R_2SiO)$ units per molecule and typically has a value of 10 or more, 15 or more, 20 or more, 25 or more, even 30 or more while at the same time is generally 150 or less, 140 or less, 130 or less, 120 or less, 110 or less, 100 or less, 90 or less, 80 or less, 70 or less, 60 or less, 50 or less, 45 or less, 40 or less, 35 or less or even 30 or less; subscript e has a value independently in each occurrence of zero or more, one or more, even two or more and at the same time is usually 4 or less, 3 or less or even 2 or less; subscript f typically has a value of zero or more, one or more, 2 or more, 3 or more and at the same time is generally 6 or less, 5 or less, 4 or less, 3 or less, or even 2 or less; and subscript g typically has a value of zero or more, one or more, 2 or more, 3 or more, even 4 or more while at the same time generally has a value of 6 or less, even 5 or less, 4 or less, or 3 or less.

Desirably, the monotrialkoxysiloxy-terminated diorganopolysiloxane has the general molecular structure (VII):

$$(CH_3)_3SiO\text{—}((CH_3)_2SiO)_t\text{—}Si(OR^2)_3 \qquad (VII)$$

One particularly desirable trialkoxysiloxy-terminated diorganopolysiloxane has the composition of Formula (VII) with $R_2$ equal to a methyl and subscript t equal to a value of 130 or less, preferably 120 or less, preferably 110 or less, more preferably 110 or less 100 or less, 90 or less, 80 or less, 70 or less, 60 or less, 50 or less, 40 or less, or 30 or less while at the same time 20 more, preferably 30 or more so as to form a terminal trimethoxy functionalized silicon atom.

The concentration of monotrialkoxysiloxy-terminated diorganosiloxane is typically zero wt % or more, 0.10 wt % or more, 0.20 wt % or more, 0.30 wt % or more, 0.40 wt % or more, 0.50 wt % or more, 0.75 wt % or more, even 1.0 wt % or more or 2.0 wt % or more, while at the same time is generally 3.0 wt % or less, 2.0 wt % or less, 1.20 wt % or less, 1.15 wt % or less, or even 1.10 wt % or less based on composition weight.

The composition can further comprise (or be free of) any one or any combination of more than one additional component. Examples of such additional components include cure inhibitors, antioxidant stabilizers, pigments, viscosity modifiers, silica filler, and spacer additives. For avoidance of doubt, the composition can be free of any one or any combination or more than one of the additional components. For example, the composition can be free of silica filler. "Silica filler" refers to solid particulates that comprise silica including natural silica (such as crystalline quartz, ground quartz, and diatomaceous silica), and synthetic silica (such as fumed silica, fused silica, silica gel and precipitated silica). Additionally, or alternatively, the composition of the present invention can be free of polyether and/or silanol functional polydimethylsiloxane.

One example of a cure inhibitor is methyl(tris(1,1-dimethyl-2-propynyloxy))silane. When present, inhibitors are typically present at a concentration of 0.0001 wt % or more 0.001 wt % or more and at the same time is generally present at a concentration of 5 wt % or less, or even one wt % or less, even 0.5 wt % or less based on composition weight.

Antioxidant, if present, can be included typically at a concentration of 0.001 to one wt % of the composition weight. Antioxidants can be present alone or in combination with stabilizers. Antioxidants include phenolic antioxidants and stabilizers include organophosphorous derivatives.

Examples of pigments include carbon black, graphite, titanium dioxide, and copper phthalocyanine. When present, pigment tends to be present at a concentration of 0.0001 to one wt % based on composition weight.

Spacer additives are non-thermally conductive fillers and have average particle sizes in the range of 50-250 micrometers. Examples of spacers include glass and polymer beads.

The composition of the present invention can be a one-component or a two-component hydrosilylation curable composition.

A one-component hydrosilylation curable composition comprises the vinyl-functional polysiloxane and the silyl hydride functional polysiloxane together in a single mixture. In order for one-component hydrosilylation curable compositions to achieve shelf stability against premature curing, the platinum catalyst is generally encapsulated or otherwise inhibited from activating a hydrosilylation reaction. Heating or otherwise releasing the platinum catalyst triggers its activity and the hydrosilylation curing of the composition.

A two-component hydrosilylation curable composition comprises two separate parts: a first part comprising the vinyl-functional polysiloxane and a second part comprising the silyl hydride functional polysiloxane. The platinum hydrosilylation catalyst is typically included in the first part with the vinyl-functional polysiloxane. A beneficial aspect of the present invention is that the trialkoxy functional polysiloxane can be present in both parts of the two-component hydrosilylation curable composition and can preferentially increase the low shear viscosity of each part relative to the high shear viscosity so as to achieve 50% increase or more, even 100% or more increase in thixotropic index for each part. Thermally conductive filler can be present in both parts so the fact the trialkoxy functional polysiloxane can impact each part in such a way increases filler stability in each part due to a preferential increase in low shear viscosity while maintaining ability to pump and mix the parts under higher shear due to a relatively low high shear viscosity reflected in the thixotropic index increase in each part. Even more beneficial is that because the same additive is used in each of the parts to achieve the thixotropic index increase and preferential low shear viscosity increase, once the two parts are mixed that characteristic should be maintained as the composition cures because the additives are compatible since they are the same. Two-part compositions are generally cured by mixing the first and second parts together to bring the vinyl-functional polysiloxane together with the silyl hydride functional polysiloxane in the presence of the platinum catalyst. Curing typically will occur without any heating, though heating will usually speed the curing reaction.

An example of a two-part composition of the present invention comprises the following distinct (meaning separate, kept apart) first and second parts: (1) A first part comprising (a) 7 to 35 weight-percent vinyl-functional polysiloxane; (b) 60 to 92 weight-percent thermally conductive filler; (c) 0.05 to 2.0 weight-percent trialkoxy-functional polysiloxane; (d) one to 100 weight parts per million weight parts of first part of a platinum hydrosilylation catalyst; and (e) 0.1 to 2.0 weight-percent of treating agents; and (2) a second part comprising (a) 10 to 15 weight-percent vinyl-functional polysiloxane; (b) 2 to 5 weight-percent of a silyl hydride functional polysiloxane having on average at least two silyl hydride groups per molecule; (c) 60 to 92 weight-percent thermally conductive filler; (d) 0.05 to 2.0 weight-percent trialkoxy-functional polysiloxane; (e) 0 to 1 weight-percent pigment additive; and (f) 0 to 0.01 weight-percent platinum cure inhibitor; where weight-percent values are relative to the weight of the part the component is in.

The present invention includes a process for curing the composition of the present invention, the process comprising the steps of: (a) combining together all of the components of the composition of any one previous claim; (b) optionally heating; and (c) allowing a hydrosilylation curing of the vinyl functional polysiloxane and the silyl hydride functional polysiloxane to form a cured composition. Heating is not generally required, particularly for a two-component composition, but typically will accelerate the curing of the composition.

The process for curing the composition desirably comprises applying the composition to a substrate after the combination of the components in step (a) and prior to step (b), if heating is included in the process, to form an article comprising the cured composition on the substrate. The process can further comprise contacting the composition a second component after applying the composition to a substrate and prior to step (b), if heating is included in the process, to form an article comprising the cured composition in thermal contact between a substrate and a second component.

The present invention also includes an article prepared by the process of the present invention. Examples of such articles include electronic components. The cured composition of the present invention can thermally connect a heat source and a heat sink in the article and serve as a heat bridge between them.

EXAMPLES

Table 1 lists the materials for use in the examples that follow. "V-P" refers to "vinyl-functional polysiloxane." "SH-P" refers to "silyl hydride functional polysiloxane." "TM-PS" refers to "trimethoxy-functional polysiloxane." "TCF" refers to "thermally conductive filler." "TA" refers to "treating agent."

TABLE 1

| Component | Description | Source |
| --- | --- | --- |
| V-P1 | Vinyl dimethyl terminated polydimethylsiloxane with 1.25 wt % vinyl and nominal viscosity of 78 milliPascal * seconds (mPa * s), molecular weight of 6,000 and having molecular structure (I) where R is methyl, x = y = 2 and d is approximately 78. | Available under the name DMS-V21 from Gelest. |
| V-P2 | Vinyl dimethyl terminated polydimethylsiloxane with 0.42 wt % vinyl and nominal viscosity of 430 mPa * s. molecular weight of 17,200 and having molecular structure (I) where R is methyl, x = y = 2 and d isapproximately 230. | Available under the name DMS-V25 from Gelest. |
| TA1 | n-decyltrimethoxysilane | Available under the name SID2670.0 from Gelest. |
| TA2 | Polysiloxane having an average molecular structure of: $(CH_3)_3SiO[(CH_3)_2SiO]_{110}Si(OCH_3)_3$ | Synthesize according to teachings in US2006/0100336. |
| TCF1 | Alumina particle having an average particle size of 2 micrometers | Available under the name A-CF-2 from ZhengZhou Light Metals Research Institute of Chialco. |
| TCF2 | Alumina particle having an average particle size of 2 micrometers. | Available under the name ALM-41-01 from Sumitomo Company. |
| TCF3 | Alumina particles having an average particle size of 9 micrometers. | Available under the name A-CF-6 from ZhengAhou Light Metals Research Institute of CHIALCO. |
| TCF4 | Alumina particles having an average particle size of 40 micrometers | Available under the name DAW-45 from Denka Company Limited in Japan. |
| Platinum Catalyst I | 1,3-diethenyl-1,1,3,3-tetramethyldisiloxane platinum complex (CAS 68478-92-2) | Available under the name SYL-OFF ™ 4000 catalyst from The Dow Chemical Company. |

TABLE 1-continued

| Component | Description | Source |
|---|---|---|
| Platinum Catalyst II | Platinum on alumina, 1 wt % loading, 3.2 millimeter pellets | Available under the number 232114 from Aldrich. |
| Cure Inhibitor | Methyl(tris(1,1-dimethyl-2-propynyloxy))silane | Available from Alfa Chemistry under catalog number ACM83817714. |
| Carbon Black | Carbon black paste consisting of 50 wt % carbon black in dimethyl siloxanes, dimethylvinylsiloxy-terminated with nominal viscosity of 1950 milliPascal * seconds (mPa * s) and 0.23 wt % vinyl | Available under the name SILASTIC ™ CP-84 black pigment from The Dow Chemical Company. |
| SH-P1 | Trimethyl terminated dimethyl-co-hydrogen methyl polysiloxane with a nominal viscosity of 19 mPa * s, 0.11 mole-percent Si—H functionality and having a molecular weight of 1900 to 2000 and having molecular structure (II) where each R is a methyl and subscript a is 6-7 percent based on the sum of subscripts a and b. | Available under the name HMS-071 from Gelest. |
| SH-P2 | Trimethyl terminated dimethyl-co-hydrogen methyl polysiloxane with a nominal viscosity of 14 mPa * s, 0.36 mole-percent Si—H functionality and a molecular weight of 1900 to 2000 and having molecular structure (II) where each R is a methyl and subscript a is 25-35 percent based on the sum of subscripts a and b. | Available under the name HMS-301 from Gelest. |
| TM-PS1 | Dimethyl siloxane, timethoxy -terminated with nominal viscosity of 5000 mPa * s and a molecular weight of approximately 48,000. Average molecular structure (III) where each R is methyl and subscript c is approximately 645. | (see synthesis below) |
| TM-PS2 | Trimethoxy functional polysiloxane having structure (IV) where each R is methyl, R" is —$CH_2CH_2$—, m is approximately 140 and n is 3. Average molecular weight is 12,000. | Available under the name SILMER TMS C50 form The Siltech Company. |
| TM-PS3 | Branched trimethoxy-functionalized polysiloxane having structure (V) where each R is methyl, R" is —$CH_2CH_2$— and p is approximately 38-39. Average molecular weight is approximately 12,000. | (see synthesis below) |
| TM-P4 | 1,6-bis(trimethoxysilyl)hexane: $(CH_3O)_3Si$—$(CH_2)_6$—$Si(OCH_3)_3$ | Available from Gelest under product code SIB1832.0. |
| TM-PS5 | Polysiloxane having the following average molecular structure: $(CH_3O)_3Si$—$(CH_2)_2$—$Si(CH_3)_2$—$[OSi(CH_3)_2]_9$—O—$Si(CH_3)_2$—$(CH_2)_2$—$Si(OCH_3)_3$ Average molecular weight of 1,100. | Available under the name SILMER TMS Di-10 from The Siltech Company. |

SYL-OFF is a trademark of The Dow Chemical Company
SILASTIC is a trademark of Dow Corning Corporation.
SILMER is a trademark of The Siltech Corporation.

Synthesis of TM-PS1

Load 90.82 wt % of dimethyl siloxane, hydroxyl terminated (Aldrich), 9.1 wt % of methyl orthosilicate (Aldrich) and 0.08 wt % glacial acetic acid (Aldrich) into a reactor (for example, a round bottom flask), mix and then heat to 120-130° C. and continue to mix for 4 hours. Remove acetic acid, methanol and excess methyl orthosilicate under vacuum under vacuum at 150° C. for 5 hours. The resulting product is TM-PS1.

Synthesis of TM-PS3

Load 100 g of dimethyl cyclics with tetrakis(vinyldimethylsiloxy)silane (0.9 wt % vinyl content, CAS316374-82-0, available from Skyrun Industrial Co., Ltd.) and 9.42 g of 1(-2-(trimethoxysilyl)ethyl)-1,1,3,3-tetramethyldisiloxane (available from Gleader Advanced Material Co., Ltd.) into a round bottom flask. Add 0.06 g of Platinum Catalyst II. Mix for 3 hours at 90° C. Remove platinum residue by filtration to obtain TM-PS3.

Sample Compositions

Prepare sample compositions as two-part curable compositions comprising a first part (Part A) and a second part (Part B).

Part A Compositions

The formulation for each Part A Sample is in Table 2. Load the VF-P component into the container of a 10-Liter Turello mixer and mix for 5 minutes at 20 revolutions per minute (RPM) under nitrogen flow of 0.4 cubic meters per hour. Add the TCF components and continue stirring for 15 minutes. Heat the mixture to 120° C. under vacuum (approximately 0.1 megaPascal) for one hour. Cool to 22° C. and add the Platinum Catalyst I component and mix for 15 minutes at 750 RPM under nitrogen purge.

Part B Compositions

The formulation for each Part B Sample is in Table 3. Load the VF-P components, carbon black, and TA components into a the container of a 10-Liter Turello mixer and mix for 5 minutes at 20 RPM under nitrogen flow of 0.4 cubic meters per hour. Add the TCF components and continue stirring for 15 minutes. Heat the mixture to 120° C. under vacuum (approximately 0.1 megaPascal) for one hour. Cool to 22° C. and add the cure inhibitor, SHF-P components and TM-PS component and mix for 15 minutes at 750 RPM under nitrogen purge.

Table 4 presents the low shear viscosity, high shear viscosity and thixotropic index for each sample of the A and B parts. Determine low shear and high shear viscosities and thixotropic index as described herein above.

TABLE 2

Wt % of Each Component in the Part A Sample relative to Sample Weight

| Sample | V-P1 | TA1 | TA2 | TCF1 | TCF2 | TCF3 | TCF4 | Platinum Catalyst I | TM-PS1 | TM-PS2 | TM-PS3 | TM-P4 | TM-PS5 |
|---|---|---|---|---|---|---|---|---|---|---|---|---|---|
| Ref 1 | 14.77 | 0.2 | 0.45 | 28.17 | 0 | 56.33 | 0 | 0.08 | 0 | 0 | 0 | 0 | 0 |
| 1 | 14.72 | 0.2 | 0.45 | 28.17 | 0 | 56.33 | 0 | 0.08 | 0.05 | 0 | 0 | 0 | 0 |
| 2 | 14.5 | 0.2 | 0.45 | 28.17 | 0 | 56.33 | 0 | 0.08 | 0.27 | 0 | 0 | 0 | 0 |
| 3 | 14.23 | 0.2 | 0.45 | 28.17 | 0 | 56.33 | 0 | 0.08 | 0.54 | 0 | 0 | 0 | 0 |
| 4 | 13.69 | 0.2 | 0.45 | 28.17 | 0 | 56.33 | 0 | 0.08 | 1.08 | 0 | 0 | 0 | 0 |
| 5 | 12.62 | 0.2 | 0.45 | 28.17 | 0 | 56.33 | 0 | 0.08 | 2.15 | 0 | 0 | 0 | 0 |
| 6 | 14.67 | 0.2 | 0.45 | 28.17 | 0 | 56.33 | 0 | 0.08 | 0 | 0.1 | 0 | 0 | 0 |
| 7 | 14.47 | 0.2 | 0.45 | 28.17 | 0 | 56.33 | 0 | 0.08 | 0 | 0.3 | 0 | 0 | 0 |
| 8 | 14.67 | 0.2 | 0.45 | 28.17 | 0 | 56.33 | 0 | 0.08 | 0 | 0 | 0.1 | 0 | 0 |
| 9 | 14.47 | 0.2 | 0.45 | 28.17 | 0 | 56.33 | 0 | 0.08 | 0 | 0 | 0.3 | 0 | 0 |
| Ref 2 | 14.69 | 0.2 | 0.38 | 0 | 38.09 | 0 | 46.56 | 0.08 | 0 | 0 | 0 | 0 | 0 |
| 10 | 14.64 | 0.2 | 0.38 | 0 | 38.09 | 0 | 46.56 | 0.08 | 0.05 | 0 | 0 | 0 | 0 |
| 11 | 14.44 | 0.2 | 0.38 | 0 | 38.09 | 0 | 46.56 | 0.08 | 0.25 | 0 | 0 | 0 | 0 |
| 12 | 14.64 | 0.2 | 0.38 | 0 | 38.09 | 0 | 46.56 | 0.08 | 0 | 0 | 0 | 0.05 | 0 |
| 13 | 14.44 | 0.2 | 0.38 | 0 | 38.09 | 0 | 46.56 | 0.08 | 0 | 0 | 0 | 0.25 | 0 |
| 14 | 14.64 | 0.2 | 0.38 | 0 | 38.09 | 0 | 46.56 | 0.08 | 0 | 0 | 0 | 0 | 0.05 |
| 15 | 14.44 | 0.2 | 0.38 | 0 | 38.09 | 0 | 46.56 | 0.08 | 0 | 0 | 0 | 0.1 | 0.25 |

TABLE 3

Wt % of Each Component in the Part B Sample relative to Sample Weight

| Sample | V-P1 | V-P2 | SH-P1 | SH-P2 | TA1 | TA2 | TCF1 | TCF2 | TCF3 | TCF4 | Carbon Black | Cure Inhibitor | TM-PS1 | TM-PS2 | TM-PS3 | TM-P4 | TM-PS5 |
|---|---|---|---|---|---|---|---|---|---|---|---|---|---|---|---|---|---|
| Ref 1 | 9.53 | 1.65 | 1.88 | 1.72 | 0.2 | 0.42 | 28.17 | 0 | 56.33 | 0 | 0.1 | 0.001 | 0 | 0 | 0 | 0 | 0 |
| 1 | 9.53 | 1.6 | 1.88 | 1.72 | 0.2 | 0.42 | 28.17 | 0 | 56.33 | 0 | 0.1 | 0.001 | 0.05 | 0 | 0 | 0 | 0 |
| 2 | 9.53 | 1.38 | 1.88 | 1.72 | 0.2 | 0.42 | 28.17 | 0 | 56.33 | 0 | 0.1 | 0.001 | 0.27 | 0 | 0 | 0 | 0 |
| 3 | 9.53 | 1.11 | 1.88 | 1.72 | 0.2 | 0.42 | 28.17 | 0 | 56.33 | 0 | 0.1 | 0.001 | 0.54 | 0 | 0 | 0 | 0 |
| 4 | 9.53 | 0.57 | 1.88 | 1.72 | 0.2 | 0.42 | 28.17 | 0 | 56.33 | 0 | 0.1 | 0.001 | 1.08 | 0 | 0 | 0 | 0 |
| 5 | 9.03 | 0 | 1.88 | 1.72 | 0.2 | 0.42 | 28.17 | 0 | 56.33 | 0 | 0.1 | 0.001 | 2.15 | 0 | 0 | 0 | 0 |
| 6 | 9.53 | 1.55 | 1.88 | 1.72 | 0.2 | 0.42 | 28.17 | 0 | 56.33 | 0 | 0.1 | 0.001 | 0 | 0.1 | 0 | 0 | 0 |
| 7 | 9.53 | 1.35 | 1.88 | 1.72 | 0.2 | 0.42 | 28.17 | 0 | 56.33 | 0 | 0.1 | 0.001 | 0 | 0.3 | 0 | 0 | 0 |
| 8 | 9.53 | 1.55 | 1.88 | 1.72 | 0.2 | 0.42 | 28.17 | 0 | 56.33 | 0 | 0.1 | 0.001 | 0 | 0 | 0.1 | 0 | 0 |
| 9 | 9.53 | 1.35 | 1.88 | 1.72 | 0.2 | 0.42 | 28.17 | 0 | 56.33 | 0 | 0.1 | 0.001 | 0 | 0 | 0.3 | 0 | 0 |
| Ref 2 | 10.0 | 1.0 | 2.36 | 1.51 | 0.2 | 0.18 | 0 | 38.09 | 0 | 46.56 | 0.1 | 0.003 | 0 | 0 | 0 | 0 | 0 |
| 10 | 10.0 | 0.95 | 2.36 | 1.51 | 0.2 | 0.18 | 0 | 38.09 | 0 | 46.56 | 0.1 | 0.003 | 0.05 | 0 | 0 | 0 | 0 |
| 11 | 10.0 | 0.75 | 2.36 | 1.51 | 0.2 | 0.18 | 0 | 38.09 | 0 | 46.56 | 0.1 | 0.003 | 0.25 | 0 | 0 | 0 | 0 |
| 12 | 10.0 | 0.95 | 2.36 | 1.51 | 0.2 | 0.18 | 0 | 38.09 | 0 | 46.56 | 0.1 | 0.003 | 0 | 0 | 0 | 0.05 | 0 |
| 13 | 10.0 | 0.75 | 2.36 | 1.51 | 0.2 | 0.18 | 0 | 38.09 | 0 | 46.56 | 0.1 | 0.003 | 0 | 0 | 0 | 0.25 | 0 |
| 14 | 10.0 | 0.95 | 2.36 | 1.51 | 0.2 | 0.18 | 0 | 38.09 | 0 | 46.56 | 0.1 | 0.003 | 0 | 0 | 0 | 0 | 0.05 |
| 15 | 10.0 | 0.75 | 2.36 | 1.51 | 0.2 | 0.18 | 0 | 38.09 | 0 | 46.56 | 0.1 | 0.003 | 0 | 0 | 0 | 0 | 0.25 |

TABLE 4

| | Part A Composition | | | Part B Composition | | |
|---|---|---|---|---|---|---|
| Sample | low shear viscosity (mPa * s) | high shear viscosity (mPa * s) | thixotropic index | low shear viscosity (mPa * s) | high shear viscosity (mPa * s) | thixotropic index |
| Ref 1 | 79,380 | 8,090 | 9.81 | 63,500 | 7,140 | 8.89 |
| 1 | 184,300 | 9,150 | 20.14 | 160,500 | 7,955 | 20.18 |
| 2 | 309,600 | 10,320 | 30.00 | 230,200 | 8,731 | 26.37 |
| 3 | 317,500 | 11,030 | 28.79 | 150,800 | 7,699 | 19.59 |
| 4 | 158,800 | 8,731 | 18.19 | 118,800 | 7,720 | 15.39 |
| 5 | 95,250 | 7,223 | 13.19 | 78,300 | 7,530 | 10.40 |
| 6 | 276,500 | 9,785 | 28.26 | 201,300 | 7,987 | 25.20 |
| 7 | 305,400 | 9,970 | 30.63 | 159,600 | 7,394 | 21.59 |
| 8 | 167,400 | 9,765 | 17.14 | 131,700 | 7,763 | 16.97 |
| 9 | 175,800 | 9,670 | 18.18 | 139,500 | 7,763 | 17.97 |
| Ref 2 | 30,200 | 3,890 | 7.76 | 23,500 | 3,070 | 7.65 |
| 10 | 94,500 | 4,150 | 22.77 | 83,500 | 3,550 | 23.52 |
| 11 | 116,400 | 4,330 | 26.88 | 100,200 | 3,670 | 27.30 |
| 12 | 30,500 | 3,950 | 7.72 | 25,000 | 3,050 | 8.20 |
| 13 | 29,900 | 3,830 | 7.81 | 25,600 | 3,110 | 8.23 |

TABLE 4-continued

| | Part A Composition | | | Part B Composition | | |
|---|---|---|---|---|---|---|
| Sample | low shear viscosity (mPa * s) | high shear viscosity (mPa * s) | thixotropic index | low shear viscosity (mPa * s) | high shear viscosity (mPa * s) | thixotropic index |
| 14 | 34,800 | 3,980 | 8.74 | 25,900 | 3,120 | 8.30 |
| 15 | 37,500 | 4,230 | 8.87 | 26,500 | 3,240 | 8.18 |

The data in Table 4 reveals that compositions of the presently claimed invention demonstrate a preferential increase in low shear viscosity and a thixotropic index increase of 50% or more, 75% or more and in many cases even 100% or more when trimethoxy-functional polysiloxane having a molecular weight of 1200 or more is added at a concentration of 0.05 to 2.0 weight-percent based on the composition weight.

The Ref samples illustrate compositions that do not include any trimethoxy-functional polysiloxane and serve as reference compositions.

Sample 5 composition has more than 2.00 wt % trimethoxy-functional polysiloxane and the data shows that the thixotropic index increase over the reference composition is less than a 50% increase while samples 1-4 illustrate the same composition with less than 2.00 wt % of the same trimethoxy-functional polysiloxane all demonstrate greater than a 50% increase in thixotropic index.

Samples 12 and 13 illustrate that a trimethoxy-functional linear molecule similar to the TM-PS1, but that is not a polysiloxane. These samples also do not demonstrate a thixotropic index increase of 50% or more even at loading where TM-PS1 demonstrates over a 100% increase in thixotropic index.

Samples 14 and 15 include a trimethoxy-functional polysiloxane that is linear, similar to TM-PS1, except having a molecular weight of approximately 1,100. These samples also fail to increase the composition thixotropic index by 50% or more at loadings where TM-PS1 caused a thixotropic index of greater than 100%.

Samples 1-15 are two-part curable compositions. When the part A and part B compositions of each sample are mixed together the blended composition undergoes a hydrosilylation curing reaction resulting in a cured composition. The composition of each part is modified with the same trimethoxy-functionalized polysiloxane and achieves the 50% or more increase in thixotropic index with preferential low shear viscosity increase from the presence of the trimethoxy-functionalized polysiloxane. Similar results are expected if these were one-part curable compositions where curing was inhibited by using an inhibited catalyst (for example, a blocked catalyst or encapsulated catalyst) that is released by unblocking (for example UV irradiated release or thermal release of the blocking agent) or melting of the encapsulating material around the catalyst.

What is claimed is:
1. A composition comprising:
   (a) a vinyl-functional polysiloxane;
   (b) a silyl hydride functional polysiloxane having on average at least two silyl hydride groups per molecule, where the silyl hydride functional polysiloxane is a linear polysiloxane having the following general molecular structure:

$$R_{3-h}H_hSiO\text{---}(HRSiO)_a\text{---}(R_2SiO)_b\text{---}SiH_{h'}R_{3-h'} \quad \text{(II)}$$

where: R is independently in each occurrence selected from alkyl and aryl groups having from one to 6 carbon atoms; H is hydrogen, subscripts h and h' refer to the average number of terminal hydrogens on the respective ends of the molecule and have a value of 0, 1, 2, or 3; subscript a is the average number of (HRSiO) groups per molecule and is in a range of 1 to 50; subscript b is the average number of ($R_2SiO$) groups per molecule and is in a range of 01 to 150; subscript a is 5% to 50% of the sum of subscripts a and b;
   (c) 60 to 92 weight-percent thermally conductive filler;
   (d) a platinum hydrosilylation catalyst; and
   (e) 0.05 to 2.0 weight-percent of a trialkoxy-functional polysiloxane;
where the trialkoxy-functional polysiloxane has two or more trialkoxy functionalities per molecule and a number average molecular weight of 1200 or more and where weight-percents are relative to the composition weight; wherein the composition is a 2-part composition comprising distinct first and second parts; where:
   the first part comprises:
      (i) 7 to 35 weight-percent vinyl-functional polysiloxane;
      (ii) 60 to 92 weight-percent thermally conductive filler;
      (iii) 0.05 to 2.0 weight-percent trialkoxy-functional polysiloxane;
      (iv) one to 1000 weight parts per million weight parts of first part of a platinum hydrosilylation catalyst; and
      (v) 0.1 to 2.0 weight-percent of treating agents; and
   the second part comprises:
      (i) 10 to 15 weight-percent vinyl-functional polysiloxane;
      (ii) 2 to 5 weight-percent of a silyl hydride functional polysiloxane having on average at least two silyl hydride groups per molecule;
      (iii) 60 to 92 weight-percent thermally conductive filler;
      (iv) 0.025 to 2.0 weight-percent trialkoxy-functional polysiloxane;
      (v) 0 to 1 weight-percent pigment additive; and
      (vi) 0 to 0.01 weight-percent platinum cure inhibitor;
where weight-percent values are relative to the weight of the part the component is in.

2. The composition of claim 1, wherein the trialkoxy functional polysiloxane contains one or fewer silyl hydride groups per molecule.

3. The composition of claim 1, wherein the concentration of trialkoxy-functional polysiloxane is in a range of 0.05 to 0.75 weight-percent of the composition weight.

4. The composition of claim 1, wherein the composition is free of polyether, silica filler and silanol functional polydimethylsiloxane.

5. A process comprising the steps of: (a) combining together all of the components of the composition of any one previous claim; (b) optionally heating; and (c) allowing a hydrosilylation curing of the vinyl functional polysiloxane and the silyl hydride functional polysiloxane to form a cured composition.

6. The process of claim 5, further comprising applying the composition to a substrate after step (a) and to produce an article comprising the cured composition on a substrate.

7. The process of claim 5, further comprising contacting the composition with both a substrate and a second component after step (a) and prior to step (b), if heating is included in the process, to form an article comprising the cured composition in thermal contact between a substrate and a second component.

8. An article comprising a cured composition in contact with a substrate prepared according to the process of claim 6.

9. The article of claim 8 where the article is an electronic component.

\* \* \* \* \*